M. R. HELIKER.
Churn Dasher.
No. 85,445. Patented Dec. 29, 1868.
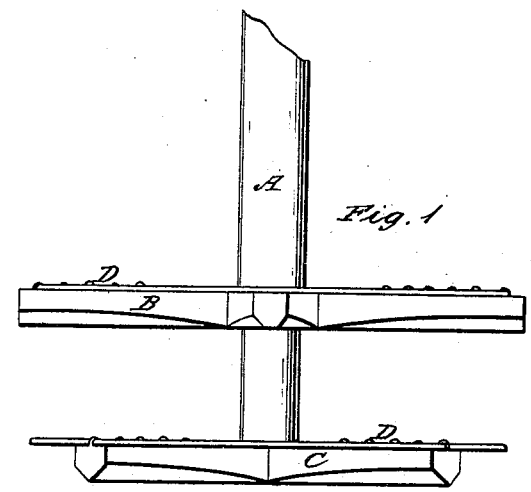
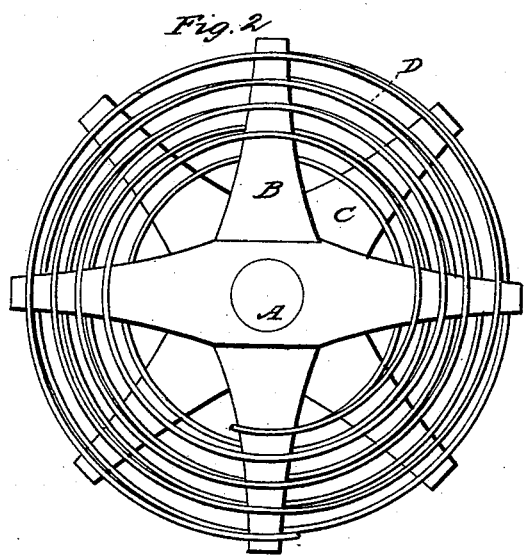
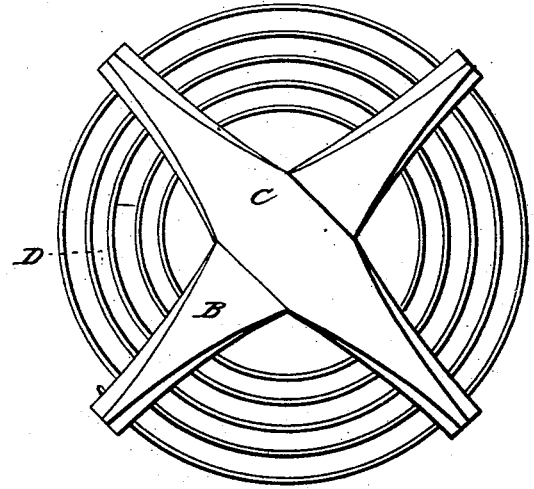

M. R. HELIKER, OF NORWALK, OHIO.

Letters Patent No. 85,445, dated December 29, 1868.

IMPROVEMENT IN CHURN-DASHER.

The Schedule referred to in these Letters Patent and making part of the same.

*To all whom it may concern:*

Be it known that I, M. R. HELIKER, of Norwalk, in the county of Huron, State of Ohio, have invented certain new and useful Improvements in Churn-Dasher; and I do hereby declare that the following is a full and complete description of the same, reference being had to the accompanying drawing, making a part of this specification, in which—

Figure 1 is a side view of the dasher.

Figure 2, a view of the under side.

Figure 3, a view of the top.

Like letters of reference refer to like parts in the several views.

The nature of this invention relates to a churn-dasher, consisting of two pairs of radial arms, to which are attached concentric circles or coils of wire, said dasher being an improvement of a former invention for which Letters Patent were granted to me.

In fig. 1, A is the handle of the dasher, to which are attached the radial arms B C. Said arms are arranged on the handle, one above the other, so that a considerable space is open between them, as shown in the drawing.

To one side of each set of arms are secured circles of wire, D, either as a series of concentric circles, or a single piece coiled, as shown in fig. 2.

My former dasher, referred to, consisted of but one cross or pair of radial arms, to each side of which the circles of wires were attached in the same manner as those now under consideration.

The objection to that dasher is, the circles of wire, in consequence of being placed so close to each other, (the thickness of the arms only from each other,) the butter and thick cream, on churning, lodge between them, thereby clogging the dasher and obstructing the cream from passing between the coils; hence the dasher becomes hard to work, and if the cream and butter are quite solid, the dasher cannot be used, and is therefore of little or no value. But by the use of two sets of arms arranged on the handle, apart from each other, as shown in fig. 1, this difficulty is avoided, as the larger space between the arms allows ample room for the passage of the butter and cream; hence there is no clogging of the dasher, but it will work freely and easily in the cream.

Another objection to the dasher is, that the limited space between the two sets of wires prevents the hand from being introduced between them for the purpose of cleaning it; hence some trouble is experienced in removing all the cream and particles of butter that may adhere to the dasher. In the dasher as improved, this difficulty is obviated, as the wide space gives sufficient room for the hand to be introduced; therefore less trouble is found in cleaning it.

With this dasher the cream is more thoroughly agitated, and with greater violence, than it can be with the old one; therefore the work of churning is done in a shorter time and with less labor.

What I claim as my invention, and desire to secure by Letters Patent, is—

A dasher, when constructed with two pairs of radial arms, B C, arranged in relation to each other, and in combination with the wires D, substantially as and for the purpose set forth.

M. R. HELIKER.

Witnesses:
J. H. BURRIDGE,
W. H. BURRIDGE.